United States Patent Office 3,256,297
Patented June 14, 1966

---

3,256,297
1,2-DIMETHYL AND 1,2,2 TRIMETHYL-3-PHENYL-3-PROPIONYLOXY PYRROLIDINES
John Frederick Cavalla, Isleworth, and John Davoll, Shepperton, England, assignors to Parke, Davis & Company, Detroit, Mich., a corporation of Michigan
No Drawing. Filed Mar. 20, 1959, Ser. No. 800,643
Claims priority, application Great Britain, Apr. 2, 1958, 10,617/58
4 Claims. (Cl. 260—326.3)

This invention relates to pyrrolidine compounds and to methods for the production of the same. More particularly, the invention relates to pyrrolidine compounds and acid-addition salts thereof, said pyrrolidine compounds having in their free base form the formula

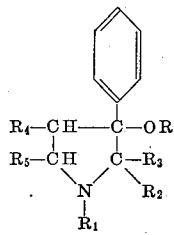

where R represents hydrogen or a lower fatty acid acyl radical; $R_1$ represents hydrogen or a hydrocarbon radical, specifically, a lower alkyl radical, a lower alkenyl radical, a phenylalkyl radical or a phenylalkenyl radical; and $R_2$, $R_3$, $R_4$ and $R_5$ are the same or different and represent hydrogen or lower alkyl radicals. The lower alkyl and lower alkenyl radicals contain preferably not more than 4 carbon atoms. Some examples of the acid-addition salts of these compounds are the mineral acid salts such as the hydrochloride, hydrobromide, sulphate and phosphate; the organic acid salts such as the acetate, benzoate, tartrate, maleate, p-toluenesulphonate, benzenesulphonate and citrate; and the salts with other strong acids such as the sulphamate.

In accordance with the invention, pyrrolidine compounds having the above formula and acid-addition salts thereof can be produced in a number of ways. For example, the compounds wherein R is hydrogen and $R_1$ is a hydrocarbon radical can be prepared by introducing a phenyl group into a 3-pyrrolidone of the formula

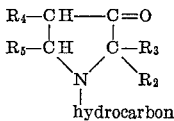

where $R_2$, $R_3$, $R_4$ and $R_5$ have the same significance as given above. This is most conveniently accomplished by reacting the 3-pyrrolidone compound with a reactive phenylmetallo compound under anhydrous conditions and decomposing the resulting reaction product with water. Examples of suitable reactive phenylmetallo compounds are phenylalkali metals such as phenyllithium or phenylsodium, and phenylmagnesium halides such as phenylmagnesium bromide. The initial phase of the reaction can be carried out in an inert organic solvent such as ether, toluene, benzene or tetrahydrofuran. The temperature is not critical and can be varied from about —20 to 75° C. Satisfactory results are also obtained somewhat outside of this range. The quantities of the reactants are likewise not critical, but in most cases it is preferable to use an excess of the phenylmetallo compound. The decomposition phase of the reaction is, as mentioned above, carried out using water. If desired, aqueous ammonium chloride, aqueous acids or other aqueous solutions can also be used.

The compounds of this invention wherein R is a lower fatty acid acyl radical and $R_1$ is a hydrocarbon radical are preferably prepared by acylation of the corresponding 3-hydroxy compounds of the formula

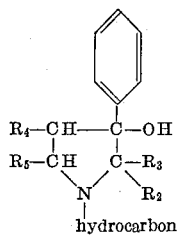

where $R_2$, $R_3$, $R_4$ and $R_5$ have the same significance as given above. The acylation is carried out by reacting the 3-hydroxy compound with a lower fatty acid or a reactive derivative thereof such as the halide or anhydride. Some examples of such acylating agents are acetic anhydride, acetyl chloride, propionyl chloride, propionic anhydride and butyryl bromide. If desired, the acylation can be carried out in the presence of a strong organic base such as triethylamine. The preparation of the desired ester can also be carried out on a reactive derivative of the 3-hydroxy compound such as an acid-addition salt or the lithium alkoxide obtained by the reaction of phenyllithium and the 3-pyrrolidone without subsequent hydrolysis. In the latter case, the necessity for isolating the free alcohol is avoided. For the purposes of this invention, the esterification of the reactive derivative is equivalent to the esterification of the free alcohol.

The substances wherein $R_1$ is hydrogen are best prepared by catalytic reduction of the corresponding N-benzyl compounds having the general formula

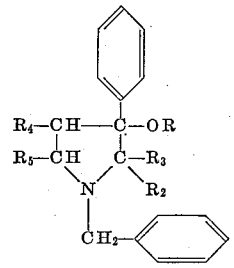

where R, $R_2$, $R_3$, $R_4$ and $R_5$ have the same significance as given above. The reduction is preferably carried out using a palladium catalyst, although other catalysts such as platinum and Raney nickel can also be used. As solvents, lower aliphatic alcohols are preferred and best results are obtained when a fairly large amount of catalyst is used. The hydrogen pressure is not critical and in most instances a pressure of up to several atmospheres suffices. The temperature is likewise not critical and can be varied from 0 to 75° C. or higher, but a temperature of about 20–25° C. is usually used.

The compounds wherein $R_1$ is a hydrocarbon group can also be produced by the introduction of the hydrocarbon group into the corresponding heterocyclic amino compounds having the general formula

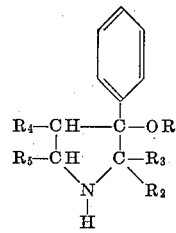

where R, $R_2$, $R_3$, $R_4$ and $R_5$ have the same significance as given above. If the hydrocarbon group to be introduced is an alkyl group, an alkylation can be carried out in any of the known ways, for example, with alkyl esters such as the halides or sulphates. The compounds wherein $R_1$ is a methyl group can also be produced by reacting the heterocyclic amino compound with formaldehyde-formic acid mixtures. If the hydrocarbon group to be introduced is an alkenyl, a phenylalkyl or a phenylalkenyl group, the reaction can be carried out with a corresponding reactive derivative such as allyl chloride, phenylpropyl bromide or cinnamyl bromide.

The free base compounds are converted to their acid-addition salts by reaction with the corresponding acid in the usual way. The acid-addition salts are converted to the free bases in the customary manner, for example, by treatment with an inorganic base such as sodium hydroxide or sodium bicarbonate.

The 3-pyrrolidones employed in the practice of the present invention can be produced in a number of ways. For example, they can be prepared by cyclization, in the presence of an organometallic compound such as sodium ethoxide, of a diester having the formula

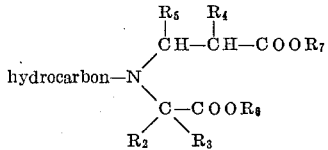

followed by hydrolytic decarboxylation of the 2- or 4-carboxylate group; where $R_2$, $R_3$, $R_4$ and $R_5$ have the same significance as given above and $R_6$ and $R_7$ are organic radicals. The 3-pyrrolidones can also be produced by the reaction of a dihalide of the formula

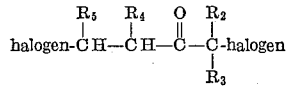

in which the carbonyl group may be protected such as by conversion into a hydroxymethylene group, with an amine having the formula $R_1NH_2$, followed by regeneration of the carbonyl group if necessary; where $R_1$, $R_2$, $R_3$, $R_4$ and $R_5$ have the same significance as given above. Still another method for the production of the 3-pyrrolidones is by the cyclization, in the presence of an organometallic compound such as a sodium alkoxide, of a dinitrile having the formula

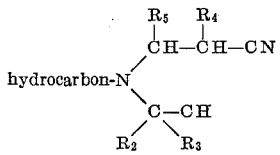

followed by hydrolysis of the resulting aminonitrile; where $R_2$, $R_3$, $R_4$ and $R_5$ have the same significance as given above.

Where starting materials for the processes of this invention can exist in asymmetric forms, the methods of the invention are applicable to racemic or to resolved, optically active forms. In those cases where optically active final products are desired, they can be obtained either by using optically active starting materials or by resolution of a racemic final product. Resolution can be carried out by fractional crystallization of a salt or an ester formed with an optically active acid.

The free bases of the invention and their acid-addition salts posses useful analgetic activity and are useful as intermediates for the preparation of products having analgetic activity. The preferred products with respect to their analgetic activity are those wherein R is a fatty acid acyl group. Such products are particularly useful analgesic agents in that they have the ability to relieve severe pain without producing the multiple side effects associated with the use of alkaloidal analgesics. Of the preferred acyl compounds, those having in free base form the formula

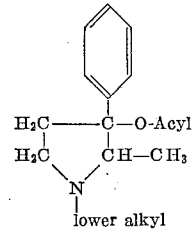

and acid-addition salts thereof are especially preferred in that they exhibit the most desirable combination of properties.

For a better understanding of the invention, some examples will now be given.

Example 1

341 g. of ethyl α-bromopropionate were added dropwise with stirring during 4 hours to 279 g. of 3-methyl-aminopropionitrile (Cook and Reed, J. Chem. Soc. 1945, 399), when the solution became hot and deposited a heavy yellow oil. Stirring was continued for two hours and the mixture left overnight. 500 ml. of ether were added and the mixture was shaken, the supernatant liquid being then decanted off. The residue was extracted further by shaking and decanting with three further portions of ether (500 ml.). The bulked ethereal extracts were concentrated and distilled in vacuo when the resulting N-(α-carbethoxyethyl)-N-(β-cyanoethyl)methylamine was distilled at 94–102° C. (0.8 mm.); $n_D^{20}$ 1.4446.

511 g. of the resulting N-(α-carbethoxyethyl)-N-(β-cyanoethyl)methylamine were dissolved in 854 g. of absolute ethanol and treated cautiously with 456 ml. of concentrated sulphuric acid. The mixture was refluxed gently (using a long air condenser) overnight (20 hours), cooled and part (500 ml.) of the alcohol removed by distilling in vacuo (bath 30° C.). The residue was poured into 2 liters of water and treated with 550 g. of solid potassium carbonate or until alkaline. The mixture was filtered, washing the solid well with chloroform (500 ml.) and the filtrate extracted with more chloroform (3 x 300 ml.). Removal of the chloroform and vacuum distillation gave N-(α-carbethoxyethyl)-N-(β-carbethoxyethyl)-methylamine, B.P. 95° C. (1.1 mm.); $n_D^{20}$ 1.4410.

"Foamed" sodium ethoxide was prepared from sodium (14 g.) and absolute alcohol (300 ml.), and to it was straightaway added a solution of 140 g. of the N-(α-carbethoxyethyl)-N-(β - carbethoxyethyl) - methylamine in 700 ml. of dry benzene. A stirrer was fitted and the mixture refluxed with stirring, the vapour being passed through a 12 inch Fenske column. The benzene-alcohol azeotrope which formed was collected at 68° C. (about 230 ml.) and then some benzene (about 50 ml.) at 80° C. The flask was cooled and 500 ml. of ice-water were added, stirring the flask until all solids had dissolved. The aqueous layer was separated from the benzene and the benzene washed with a further portion of ice-water (200 ml.). The bulked aqueous extracts were acidified to congo red using dilute hydrochloric acid and keeping the temperature below 10° C. and then made alkaline with solid potassium carbonate. The alkaline solution was extracted with chloroform (5 x 100 ml.) and the combined extracts themselves extracted with 50% (v./v.) concentrated hydrochloric acid (4 x 100 ml.). The acid extracts were refluxed for two hours then concentrated to a solid in vacuo. Crystallization from ethanol gave 1,2-dimethyl-3-pyrrolidone hydrochloride as light brown crystals, M.P. 179–182° C.

A benzene solution of 106.6 g. of 1,2-dimethyl-3-pyrrolidone (prepared from 140.9 g. of the hydrochloride by treatment with base) was added slowly with stirring over a period of one hour to a solution of phenyllithium prepared from 17.8 g. of lithium, 198 g. of bromobenzene and 700 ml. of dry ether. The resulting mixture was heated under reflux for two hours, cooled and then treated with 25 ml. of water. A mixture of 225 ml. of concentrated hydrochloric acid and 500 ml. of water was added, and the aqueous layer separated. The organic layer was washed twice with 200 ml. portions of water and the combined aqueous washings and main solution were made alkaline with dilute potassium hydroxide solution. The aqueous mixture was extracted with six 200 ml. portions of chloroform, the chloroform extracts dried and the chloroform removed by distillation. On standing the residual red oil which consisted of the desired 1,2-dimethyl - 3 - phenyl-3-pyrrolidinol solidified. The crude product can be purified by recrystallization from 500 ml. of petroleum ether to obtain yellow prisms melting at 83–84° C. A further crop of the product can be obtained by concentration of the mother liquor.

The 1,2-dimethyl-3-pyrrolidone employed in this process was also prepared as follows: Lactonitrile (1050 g.) was added gradually to a solution of 1240 g. of β-methylaminopropionitrile in 1500 ml. of benzene with external cooling as required to maintain the temperature slightly below the reflux point. The mixture was then allowed to stand at room temperature overnight. The aqueous phase was discarded and the benzene phase was concentrated by evaporation under reduced pressure. An additional quantity of water separated during the evaporation and was discarded. The benzene solution was then added to a refluxing solution of 13.5 g. of sodium in 2600 ml. of tert.-butanol at such a rate that the mixture was maintained under reflux. Following the addition of the benzene solution, and the separation of an insoluble solid product, the stirred mixture was heated under reflux for two more hours and then cooled to 10–15° C. The crystalline product, 3 - amino - 4-cyano-1,2-dimethyl-3-pyrroline, M.P. 148–151° C. was collected on a filter and washed with a mixture of ether and tert.-butanol. 713 g. of this product was added with stirring over a period of 25 minutes to 2300 ml. of cooled, concentrated hydrochloric acid during which time the temperature rose from 12 to 30° C. The mixture was cooled to 21° C., insulated and allowed to stand for 20 hours during which time the temperature rose to about 34° C. and then fell. The stirred solution was warmed gradually to reflux temperature over a 90-minute period and then maintained under reflux for 30 minutes to complete the evolution of carbon dioxide. The mixture was then cooled to 30° C. and filtered from ammonium chloride. The ammonium chloride was washed with solvent and the combined filtrate and washings were evaporated to a small volume under reduced pressure, cooled and treated with 750 ml. of 10-normal sodium hydroxide plus 60 g. of solid sodium hydroxide. A solid and oil were thrown out of solution. The mixture was filtered and extracted with a total of 900 ml. of ether in 6 portions. The combined ethereal extract was dried over sodium sulphate, concentrated and fractionally distilled to give 1,2-dimethyl-3-pyrrolidone, B.P. 52° C. at 21 mm.; $n_D^{20}$ 1.4440.

Example 2

200 ml. of freshly distilled propionyl chloride were added to 99.7 g. of 1,2-dimethyl-3-phenyl-3-pyrrolidinol (prepared as in Example 1) in 1 litre of dry ether with stirring. The mixture was allowed to stand overnight, and then the excess of propionyl chloride and ether were removed by distillation. The residue was dissolved in water, the mixture treated with dilute potassium carbonate solution, and then extracted with five 150 ml. portions of ether. The ether extract was dried and evaporated, and the residue was distilled in vacuo to obtain the desired 1,2 - dimethyl - 3 - phenyl - 3 - propionyloxypyrrolidone; B.P. 117–130° C. at 1.5 mm.; $n_D^{20}$ 1.5145.

The hydrochloride salt of 1,2-dimethyl - 3 - phenyl-3-propionyloxypyrrolidine was prepared by dissolving the free base obtained as described above in ether, and treating the resulting solution with dry hydrogen chloride. The solid hydrochloride was collected and purified by recrystallization from ethanol-ether mixtures; M.P. 190–191° C. By the substitution of dry hydrogen bromide for the hydrogen chloride, the compound obtained was the ether-insoluble hydrobromide.

Example 3

500 g. of methyl methacrylate monomer in 440 ml. of methanol was added dropwise with stirring over three hours to a solution of 310 g. of methylamine in 33% ethanol at 10–15° C., and allowed to stand at room temperature overnight. The alcohol was evaporated and the residue fractionally distilled in vacuo to give methyl α-methyl-β-methylaminopropionate, B.P. 66° C. (20 mm.); $n_D^{20}$ 1.4235. (Howton, J. Org. Chem. 1945, 10, 277.)

307 g. of ethyl chloroacetate was added dropwise with stirring to 656 g. of the methyl α-methyl-β-methylaminopropionate during three hours. The mixture was allowed to stand at room temperature overnight, then diluted with 1 litre of ether and filtered, the insoluble material being washed several times with ether. The ether was removed and the residue distilled in vacuo to give N-(carbethoxymethyl)-N-(β-carbomethoxypropyl) - methylamine, B.P. 89.5° C. (1.0 mm.); $n_D^{20}$ 1.4352.

"Foamed" sodium ethoxide was prepared from sodium (15 g.) and absolute alcohol (300 ml.) and to it was added a solution of 146 g. of the N-(carbethoxymethyl)-N-(β-carbomethoxypropyl)methylamine in 950 ml. of dry benzene. The resulting suspension was refluxed with stirring, and the vapour was passed through a 12 inch Fenske column. The benzene-alcohol azeotrope which formed was collected, and then a small part of the benzene was also collected. The residue was cooled and treated with 500 ml. ice-water, extracted and washed with more ice-water (2 x 200 ml.). The extracts were acidified to congo red, then basified with potassium carbonate, and then extracted with chloroform (4 x 100 ml.). The chloroform extracts were extracted with constant boiling hydrochloric acid (4 x 100 ml.) and the extracts were refluxed for two hours, after which they were concentrated to give a solid which on crystallization from ethanol gave 1,4-dimethyl-3-pyrrolidone hydrochloride, M.P. 123–124° C.

A benzene solution containing 8.7 g. of 1,4-dimethyl-3-pyrrolidone (prepared from the hydrochloride in the usual way) was added dropwise with stirring to an ether solution of phenyllithium prepared from 1.44 g. of lithium and 16 g. of bromobenzene. After the addition was complete (about one-half hour) the mixture was heated under reflux for two hours. The reaction mixture was cooled, treated with water and then with an excess of hydrochloric acid. The organic layer was separated and then extracted with fresh portions of dilute hydrochloric acid. The acid extracts were added to the main acid layer, and the resulting solution was made alkaline with potassium hydroxide. The solution was extracted with chloroform, the chloroform solution dried, and then the chloroform was distilled off. The residue which consisted of the desired 1,4-dimethyl-3-phenyl-3-pyrrolidinol was purified by crystallizing from petroleum ether, M.P. 74–76° C.

The citrate addition salt was prepared by mixing solutions of the free base and citric acid in methanol and concentrating the mixture to a small volume.

Example 4

15 g. of propionyl chloride were added to 8 g. of 1,4-dimethyl-3-phenyl-3-pyrrolidinol (prepared as in Example 3) in 80 ml. of dry ether and the reaction mixture was allowed to stand at room temperature overnight. The reaction mixture was evaporated in vacuo, and the residue was dissolved in water, the resulting solution being basified with potassium carbonate. The free base, 1,4-dimethyl-3-phenyl-3-propionyloxypyrrolidine, was extracted with ether, the ether extract dried, and the ether removed by distillation. Distillation of the residue in vacuo yielded the desired 1,4-dimethyl-3-phenyl-3-propionyloxypyrrolidine in pure form; B.P. 110–112° C. at 0.9 mm.; $n_D^{20}$ 1.5092.

Example 5

95 g. of ethyl chloroacetate were added dropwise with stirring to 224 g. of ethyl β-methylaminobutyrate (Morsch, Monatsh., 1932, 60, 50), during three hours with slight warming to initiate the reaction. The mixture was allowed to stand overnight at room temperature, and then diluted with 400 ml. of ether, filtered and the solid washed well with ether. Evaporation of the ether and distillation in vacuo gave N-(carbethoxymethyl)-N-(β-carbethoxy-α-methylethyl)methylamine, B.P. 100° C. (0.8 mm.); $n_D^{20}$ 1.4404.

"Foamed" sodium ethoxide was prepared from sodium (14 g.) and absolute alcohol (280 ml.), and to it was added a solution of 141 g. of the N-(carbethoxymethyl)-N-(β-carbethoxy-α-methylethyl)methylamine in 700 ml. of dry benzene. The resulting suspension was refluxed with stirring and the vapour was passed through a 12 inch Fenske column. The benzene-alcohol azeotrope which formed was collected and then a small part of the benzene was also collected. The residue was cooled and treated with 500 ml. ice-water, extracted and washed with more ice-water (2 x 200 ml.). The extracts were acidified to Congo red, basified with potassium carbonate, and then extracted with chloroform (4 x 100 ml.). The chloroform extracts were extracted with constant boiling hydrochloric acid (4 x 100 ml.), and the bulked extracts were refluxed for two hours after which they were concentrated to give a solid which on crystallization from ethanol gave 1,5-dimethyl-3-pyrrolidone hydrochloride, M.P. 131–134° C.

A dry benzene solution containing 27.8 g. of 1,5-dimethyl-3-pyrrolidone was added dropwise with stirring over a period of two hours to an ether solution of phenyllithium prepared from 4.6 g. of lithium and 52 g. of bromobenzene. The reaction mixture was heated under reflux for two hours, cooled and treated with 20 ml. of water. An excess of dilute hydrochloric acid was added and an organic layer was separated. The organic layer was extracted with a fresh portion of dilute acid, and the acid extract was added to the main acid solution. The acidic solution was basified and extracted with chloroform. Evaporation of the chloroform yielded the desired 1,5-dimethyl-3-phenyl-3-pyrrolidinol as pale yellow crystals; M.P. after recrystallization from petroleum ether 70–71° C.

Example 6

15 ml. of freshly distilled propionyl chloride were added to 4.5 g. of 1,5-dimethyl-3-phenyl-3-pyrrolidinol (prepared as in Example 5) in 100 ml. of ether, and the resulting mixture was allowed to stand overnight at room temperature. The reaction mixture was concentrated in vacuo, and the residue was dissolved in water. The aqueous mixture was basified with potassium carbonate, extracted with ether, and the ether extract was dried. Distillation of the ether followed by distillation of the residue in vacuo yielded the desired 1,5-dimethyl-3-phenyl-3-propionyloxypyrrolidine; B.P. 121–124° C. at 1.2 mm.; $n_D^{20}$ 1.5103.

By mixing solutions of the free base and tartaric acid in isopropyl alcohol, the water-soluble tartrate was obtained.

Example 7

136.5 g. of ethyl α-bromopropionate were added dropwise with stirring to 197 g. of methyl α-methyl-β-methylaminopropionate (Howton, J. Org. Chem., 1945, 10, 277) during two hours. The mixture was allowed to stand at room temperature overnight, then diluted with 400 ml. of ether and separated, the residue being washed several times with ether (4 x 100 ml.). The ether was removed and the residue distilled in vacuo to give N-(α-carbethoxyethyl)-N-(β-carbomethoxypropyl)methylamine, B.P. 82° C. (1.0 mm.), $n_D^{20}$ 1.4359.

"Foamed" sodium ethoxide was prepared from sodium (7.5 g.) and absolute alcohol (150 ml.), and to it was added a solution of 80 g. of the N-(α-carbethoxyethyl)-N-(β-carbomethoxypropyl)methylamine in 500 ml. of dry benzene. The resulting suspension was refluxed with stirring and the vapour was passed through a 12 inch Fenske column. The benzene-alcohol azeotrope which formed was collected, and then a small part of the benzene was also collected. The residue was cooled and treated with 250 ml. of ice-water, extracted and washed with more ice-water (2 x 100 ml.). The extracts were acidified to Congo red, basified with potassium carbonate, and then extracted with chloroform (4 x 70 ml.). The chloroform extracts were extracted with constant boiling hydrochloric acid, the extracts refluxed for two hours, and then concentrated to an oil part of which was crystallized to give pink needles of pure 1,2,4-trimethyl-3-pyrrolidone hydrochloride, M.P. 181–182° C.

7.35 g. of 1,2,4-trimethyl-3-pyrrolidone (prepared from the hydrochloride in the usual way) in 50 ml. of dry ether were added dropwise with stirring to a solution of phenyllithium prepared from 1.16 g. of lithium and 13 g. of bromobenzene in 100 ml. of ether. The reaction mixture was refluxed with stirring for two hours, cooled and then treated with water. An excess of dilute hydrochloric acid was added to the mixture, and, after thorough mixing, the organic layer was removed. The organic layer was extracted with fresh portions of dilute hydrochloric acid, and the extracts were combined with the main acidic layer. The solution was made alkaline and extracted with chloroform. Evaporation of the chloroform yielded the desired 1,2,4-trimethyl-3-phenyl-3-pyrrolidinol as a light yellow solid. Recrystallization from petroleum ether yielded the pure substance; M.P. 75–77° C.

Example 8

15 g. of propionyl chloride were added to 7.3 g. of 1,2,4-trimethyl-3-phenyl-3-pyrrolidinol (prepared as in Example 7) in 80 ml. of dry ether and the mixture allowed to stand at room temperature overnight. The reaction mixture was evaporated in vacuo, and the residue was dissolved in water. The solution was basified with potassium carbonate, the liberated ester extracted with ether, and the ether evaporated. Distillation of the residue in vacuo yielded the desired 1,2,4-trimethyl-3-phenyl-3-propionyloxypyrrolidine in pure form; B.P. 110–117° C. at 0.5 mm.; $n_D^{20}$ 1.5141.

Example 9

6.8 g. of 1-methyl-3-pyrrolidone (Prill and McElvain, J. Am. Chem. Soc., 1933, 55, 1233) in 100 ml. of ether were added dropwise with stirring to a solution of phenylmagnesium bromide prepared from 2.2 g. of magnesium and 14.8 g. of bromobenzene in 100 ml. of dry ether. The resulting mixture was refluxed for 2 hours, cooled and treated with 70 ml. of cold, 5 N hydrochloric acid. The aqueous layer was separated and basified with potassium hydroxide solution. The solution was extracted with chloroform, the chloroform mixture dried, and the chloroform distilled off to obtain the desired 1-methyl-3-phenyl-3-pyrrolidinol as an oil. If desired, the product can be purified by distillation in vacuo.

Example 10

15 ml. of propionyl chloride were added to 4 g. of 1-methyl-3-phenyl-3-pyrrolidinol (prepared as in Example 9) in 100 ml. of dry ether and the resulting mixture was allowed to stand overnight at room temperature. The ether was removed by distillation and the residue dissolved in water. The solution was basified with potassium carbonate and extracted with ether. The ether extract was dried, and the ether was evaporated. Distillation of the residue in vacuo yielded the desired 1-methyl-3-phenyl-3-propionyloxypyrrolidine as a golden oil; B.P. 110° C. at 0.7 mm.; $n_D^{20}$ 1.5210.

Example 11

21.6 g. of 1-benzyl-4-methyl-3-pyrrolidone (prepared in a manner analogous to that in which 1,4-dimethyl-3-pyrrolidone was prepared in Example 3, except that benzylamine was substituted for methylamine in the first step) in 150 ml. of dry ether were added dropwise with stirring to a solution of phenyllithium prepared from 2.32 g. of lithium and 26 g. of bromobenzene in 200 ml. of dry ether. The mixture was refluxed with stirring for two hours, cooled and treated with water. An excess of hydrochloric acid was added and the aqueous acid solution removed. The organic layer was extracted with fresh portions of dilute hydrochloric acid, and the extracts were added to the main aqueous layer. The acidic solution was basified, extracted with chloroform and the chloroform extract dried. Distillation of the chloroform followed by distillation of the residue in vacuo yielded the desired 1-benzyl-4-methyl-3-phenyl-3-pyrrolidinol.

Example 12

30 g. of acetic anhydride were added slowly to 15 g. of 1-benzyl-4-methyl-3-phenyl-3-pyrrolidinol (prepared as in Example 11) in 175 ml. of dry ether, and the resulting mixture was allowed to stand overnight at room temperature. The mixture was concentrated, and the residue was distilled in vacuo to obtain the desired 1-benzyl-4-methyl-3-phenyl-3-acetoxypyrrolidine.

Example 13

15 g. of 1-benzyl-4-methyl-3-phenyl-3-acetoxypyrrolidine (prepared as in Example 12) in 200 ml. of methanol were subjected to hydrogenation under four atmospheres of hydrogen in the presence of 1 g. of a 20% palladium on charcoal catalyst until one equivalent of hydrogen was absorbed. The catalyst was removed by filtration, and the methanol was evaporated from the filtrate. Distillation of the residue in vacuo yielded the desired 4-methyl-3-phenyl-3-acetoxypyrrolidine.

The hydrochloric salt of 4-methyl-3-phenyl-3-acetoxypyrrolidine can be prepared by dissolving the free base in ether and treating the resulting solution with an excess of dry hydrogen chloride. The salt can be collected and purified by recrystallization from an isopropanol-ether mixture.

Example 14

A mixture consisting of 10.9 g. of 4-methyl-3-phenyl-3-acetoxypyrrolidine (prepared as in Example 13), 11.5 g. of formic acid, and 10 ml. of 37% formaldehyde was heated on a steam bath for three hours. The excess formic acid and formaldehyde were evaporated in vacuo and the residue was treated with water. The mixture was basified, extracted with ether, and the ether was distilled. Distillation of the residue in vacuo yielded the desired 1,4-dimethyl-3-phenyl-3-acetoxypyrrolidine.

The sulphate salt of 1,4-dimethyl-3-phenyl-3-acetoxypyrrolidine can be prepared by dissolving the free base in dry ether and adding several equivalents of sulphuric acid in dry ether. The salt can be collected and purified by recrystallization from an absolute ethanol-ether mixture.

Example 15

By the general methods hereinbefore disclosed, the following additional compounds were prepared and characterized. The free bases corresponding to the acid-addition salts listed below are oils or low melting solids.

1-methyl-2-ethyl-3-phenyl-3-propionylpyrrolidine hydrochloride, M.P. 179–181° C.
1-methyl-4-ethyl-3-phenyl-3-propionyloxypyrrolidine hydrochloride, M.P. 155° C.
1,2,5-trimethyl-3-phenyl-3-propionyloxypyrrolidine hydrochloride, M.P. 161–163° C.
1-methyl-4-propyl-3-phenyl-3-propionyloxypyrrolidine hydrochloride, M.P. 141–142° C.
1-ethyl-2-methyl-3-phenyl-3-propionyloxypyrrolidine hydrochloride, M.P. 213–214° C.
1-benzyl-2-methyl-3-phenyl-3-propionyloxypyrrolidine hydrochloride, M.P. 172–174° C.
1,2-dimethyl-3-phenyl-3-butyryloxypyrrolidine hydrochloride, M.P. 178–179° C.
2-methyl-3-phenyl-3-propionyloxypyrrolidine hydrochloride, M.P. 219° C.
1-phenethyl-2-methyl-3-phenyl-3-propionyloxypyrrolidine hydrochloride, M.P. 172–173° C.
1,2-dimethyl-3-phenyl-3-acetoxypyrrolidine hydrochloride, M.P. 182–184° C.
1,2-dimethyl-3-phenyl-3-isobutyryloxypyrrolidine hydrochloride, M.P. 209–210° C.
1,2,2-trimethyl-3-phenyl-3-propionyloxypyrrolidine hydrochloride, M.P. 177–179° C.
1-propyl-2-methyl-3-phenyl-3-propionyloxypyrrolidine hydrochloride, M.P. 201–203° C.
1-allyl-2-methyl-3-phenyl-3-propionyloxypyrrolidine hydrochloride, M.P. 189–191° C.
1-cinnamyl-2-methyl-3-phenyl-3-propionyloxypyrrolidine monotartrate, M.P. 180–181° C.
1-isopropyl-2-methyl-3-phenyl-3-propionyloxypyrrolidine monotartrate, transition point 112° C., M.P. 130° C.
d-1,2-dimethyl-3-phenyl-3-pyrrolidinol, $[\alpha]_D^{25}$ +9° (c.=2.96% in ethanol).
l-1,2-dimethyl-3-phenyl-3-pyrrolidinol, $[\alpha]_D^{24}$ −7° (c.=3.14% in ethanol).
d-1,2-dimethyl-3-phenyl-3-propionyloxypyrrolidine monotartrate, trihydrate, M.P. 93–97° C.
l-1,2-dimethyl-3-phenyl-3-propionyloxypyrrolidine monotartrate, monohydrate, M.P. 172–174° C.

We claim:
1. 1,2-dimethyl-3-phenyl-3-propionyloxypyrrolidine.
2. 1,2-dimethyl-3-phenyl-3-propionyloxypyrrolidine hydrochloride.
3. 1,2,2-trimethyl-3-phenyl-3-propionyloxypyrrolidine.
4. A member of the class consisting of 1,2-dimethyl-3-phenyl-3-propionyloxypyrrolidine, 1,2,2-trimethyl-3-phenyl-3-propionyloxypyrrolidine, and non-toxic acid-addition salts thereof.

References Cited by the Examiner

UNITED STATES PATENTS

| | | | |
|---|---|---|---|
| 2,765,314 | 10/1956 | Schmidle et al. | 260—294.3 |
| 2,784,192 | 3/1957 | Schmidle et al. | 260—294.3 |
| 2,824,875 | 2/1958 | Elpern | 260—294.3 |
| 2,846,437 | 8/1958 | Elpern | 260—294.3 |
| 2,850,500 | 9/1958 | Elpern | 260—294.3 |
| 2,878,264 | 3/1959 | Lunsford | 260—326.5 |
| 2,880,211 | 3/1959 | Elpern | 260—294.3 |
| 2,987,517 | 6/1961 | Martin et al. | |

FOREIGN PATENTS

| | | |
|---|---|---|
| 483,258 | 4/1938 | Great Britain. |
| 629,196 | 9/1949 | Great Britain. |
| 159,630 | 7/1957 | Sweden. |

OTHER REFERENCES

Richter's Organic Chemistry, vol. 3, pp. 3 to 4 (1923).

NICHOLAS S. RIZZO, Primary Examiner.

IRVING MARCUS, H. J. LIDOFF, DUVAL T. McCUTCHEN, WALTER A. MODANCE, Examiners.

JOSE TOVAR, Assistant Examiner.